US008997222B2

(12) United States Patent
Meliksetian et al.

(10) Patent No.: US 8,997,222 B2
(45) Date of Patent: *Mar. 31, 2015

(54) METHOD AND DEVICE FOR PREVENTING CSRF ATTACK

(75) Inventors: Dikran S. Meliksetian, Danbury, CT (US); Gang Niu, Shanghai (CN); Qiang Guo Tong, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/621,238

(22) Filed: Sep. 15, 2012

(65) Prior Publication Data

US 2013/0019308 A1    Jan. 17, 2013

Related U.S. Application Data

(63) Continuation of application No. 13/306,394, filed on Nov. 29, 2011.

(30) Foreign Application Priority Data

Nov. 30, 2010    (CN) .......................... 2010 1 0580357

(51) Int. Cl.
*G06F 17/30* (2006.01)
*G06F 12/14* (2006.01)
*G08B 23/00* (2006.01)
(Continued)

(52) U.S. Cl.
CPC ........ *H04L 67/2804* (2013.01); *H04L 63/1441* (2013.01); *H04L 67/02* (2013.01); *H04L 63/0807* (2013.01)
USPC .............................. 726/22; 713/189; 380/242

(58) Field of Classification Search
USPC ........ 726/1, 9, 12, 22, 26, 2–8; 713/168–174, 713/182–186, 202; 709/206, 225, 229, 249, 709/389
See application file for complete search history.

(56) References Cited

U.S. PATENT DOCUMENTS 5,966,705 A * 10/1999 Koneru et al. .................. 1/1
6,360,254 B1 * 3/2002 Linden et al. ............. 709/219
(Continued)

FOREIGN PATENT DOCUMENTS

CN    100543714 A    9/2009

OTHER PUBLICATIONS

U.S. Appl. No. 13/306,394 entitled "Method and Device for Preventing CSRF Attack"; Non-final office action dated Feb. 13, 2013 (32 pg.).
Jayaraman, K. et al. Modeling User Interactions for (Fun and) Profit: Preventing Workflow-based Attacks in Web Applications, Proceeding, PLop '09 Proceedings of the 16th Conference on Pattern Languages of Programs, ACM, New York, NY USA (16 pg.).
(Continued)

*Primary Examiner* — Evans Desrosiers
(74) *Attorney, Agent, or Firm* — Yudell Isidore PLLC; Parashos Kalaitzis

(57) ABSTRACT

The disclosure provides method for preventing CSRF attacks, in which the method provides: intercepting request sent from a client browser to a server; generating a token; generating a response to the request; inserting the token into the response to the request; and sending the response to the request to the client browser with the token inserted into the response. With the method of the disclosure, it is assured that a token is inserted into all the requests made by a user through a client browser for accessing a resource. And it can be assured that the request is issued by the user himself by verifying whether the token in the request is valid, thereby preventing a CSRF attack.

20 Claims, 4 Drawing Sheets

(51) Int. Cl.
    *H04L 29/08*     (2006.01)
    *H04L 29/06*     (2006.01)
    *H04N 7/167*     (2011.01)

(56) References Cited

U.S. PATENT DOCUMENTS

| | | | |
|---|---|---|---|
| 6,609,198 | B1 | 8/2003 | Wood et al. |
| 6,826,696 | B1 | 11/2004 | Chawla et al. |
| 7,673,135 | B2 | 3/2010 | Chin et al. |
| 8,132,242 | B1 * | 3/2012 | Wu .................. 726/8 |
| 8,181,246 | B2 * | 5/2012 | Shulman et al. ........ 726/22 |
| 2005/0210263 | A1 * | 9/2005 | Levas et al. ........ 713/182 |
| 2008/0127323 | A1 * | 5/2008 | Soin et al. ........ 726/12 |
| 2008/0320567 | A1 | 12/2008 | Shulman et al. |
| 2009/0292925 | A1 * | 11/2009 | Meisel ........ 713/176 |
| 2010/0077216 | A1 | 3/2010 | Kramer et al. |
| 2010/0100927 | A1 | 4/2010 | Bhola et al. |
| 2010/0242096 | A1 * | 9/2010 | Varadharajan et al. ........ 726/4 |
| 2011/0258704 | A1 * | 10/2011 | Ichnowski ........ 726/26 |
| 2012/0084561 | A1 * | 4/2012 | Soulios ........ 713/168 |

OTHER PUBLICATIONS

Son, Sooel, Prevent Cross-Site Request Forgery: PCRF, University of Texas, Austin, Texas USA. (10 pg.).

Korrapati, V., How to Use NetScaler Application Firewall Against CSRF Attacks, http://webcache.googleusercontent.com/search?q=cache:http//community.citrix.com/x/64JRC, Apr. 29, 2010. (3 pg.).

Zyp, Kris, "Security in Ajax", http://webcache.googleusercontent.com/search?q=cache:http://www.sitepen.com/blog/2008/09/25/security-in-ajax/, Sep. 25, 2008. (7 pg.).

Johns,.Martin, et al. "RequestRodeo: Client Side Protection Against Session Riding," University of Hamburg, Dept. of Informalities. OWASP AppSec 2006. (13 pg.).

Jayaraman, K. et al., Memento: A Framework for Hardening Web Applications, in Center for Systems Assurance Technical Report. Syracuse University, Syracuse, NY. CSA-TR-2008-11-01. (12 pg.).

China Patent Application 201010580357.3; Office Action dated Dec. 24, 2013 (7 pg.).

* cited by examiner

METHOD AND DEVICE FOR PREVENTING CSRF ATTACK

PRIORITY CLAIM

The present application is a continuation of and claims priority from U.S. patent application Ser. No. 13/306,394, filed on Nov. 29, 2011, titled "Method and Device for Preventing CSRF Attack," and claims benefit of priority under 35 USC §120 and §365 to the previously filed China Patent Application No. 201010580357.3 entitled, "Method and Device for Preventing CSFR Attack" with a priority date of Nov. 30, 2010. The content of both applications are incorporated by reference herein.

TECHNICAL FIELD

The invention relates to network security, and more particularly, the invention relates to a method for preventing network attack.

DESCRIPTION OF THE RELATED ART

As application of Internet becomes wider and wider, Internet security becomes a problem of increasing concern to people. In various existing attack methods that might threaten network security, Cross-Site Request Forgery (CSRF) attack is an attack method which forces an end user to execute unwanted actions on a web application which he is currently logged into. An attacker can force the user of a web application to execute actions selected by the attacker just with the help of little social engineering tricks, such as, via a link sent by email or chat software. For example, a user logs into a network bank to check his balance of deposit, and he goes to his favorite forum without exiting the network bank system. If the attacker has well-constructed a malicious link in the forum and induces the user to click on the link, then the user's funds in the network bank account may be transferred to an account specified by the attacker. When CSRF makes an attack directed to an ordinary user, data and operation instructions of the end user will be seriously threatened. When the attacked end user has administrator account, a CSRF attack will imperil the whole web application. Thus the hazard of CSRF attack is very great.

As for CSRF attack, the most secure prevention method is to rebuild all the existing servers so that they are capable of preventing CSRF attack. However, this is obviously impractical. As for existing server, some other solutions in the art also can not effectively prevent CSRF attack. Thus, there is a need for a method and device that are capable of effectively preventing CSRF attacks.

BRIEF SUMMARY

In illustrative embodiments of the disclosure, it is recognized that the existing technology can not effectively prevent Cross-Site Request Forgery (CSRF) attack, thus a method and device that can effectively prevent CSRF attack without modifying existing servers are proposed.

According to an embodiment of the disclosure, there is provided a method for preventing CSRF attacks, the method comprising: intercepting a request sent from a client browser to a server; generating a token; generating a response to the request; inserting the token into the response to the request; and sending to the client browser the response to the request with the token inserted in the response.

According to an embodiment of the disclosure, there is provided a method for preventing CSRF attacks, comprising: intercepting a request sent from a client browser to a server; reading a token in the request sent from the client browser to the server; verifying whether the token in the request sent from the client browser to the server is valid.

An embodiment of the disclosure also provides a computer program product corresponding to the above method.

With the above one or more embodiments provided in the embodiments of the disclosure, CSRF attack can be effectively prevented without modifying existing servers.

BRIEF DESCRIPTION OF THE DRAWINGS

The invention may be better understood by combining the description referring to drawings below, in which same or similar reference number represents same or similar component throughout drawings. The drawings are contained in the description and constitute a part of thereof along with the detailed description below, and the drawings are used to illustrate preferred embodiments and explain the principle and advantage of the disclosure, in which.

DETAILED DESCRIPTION

Figure 1:
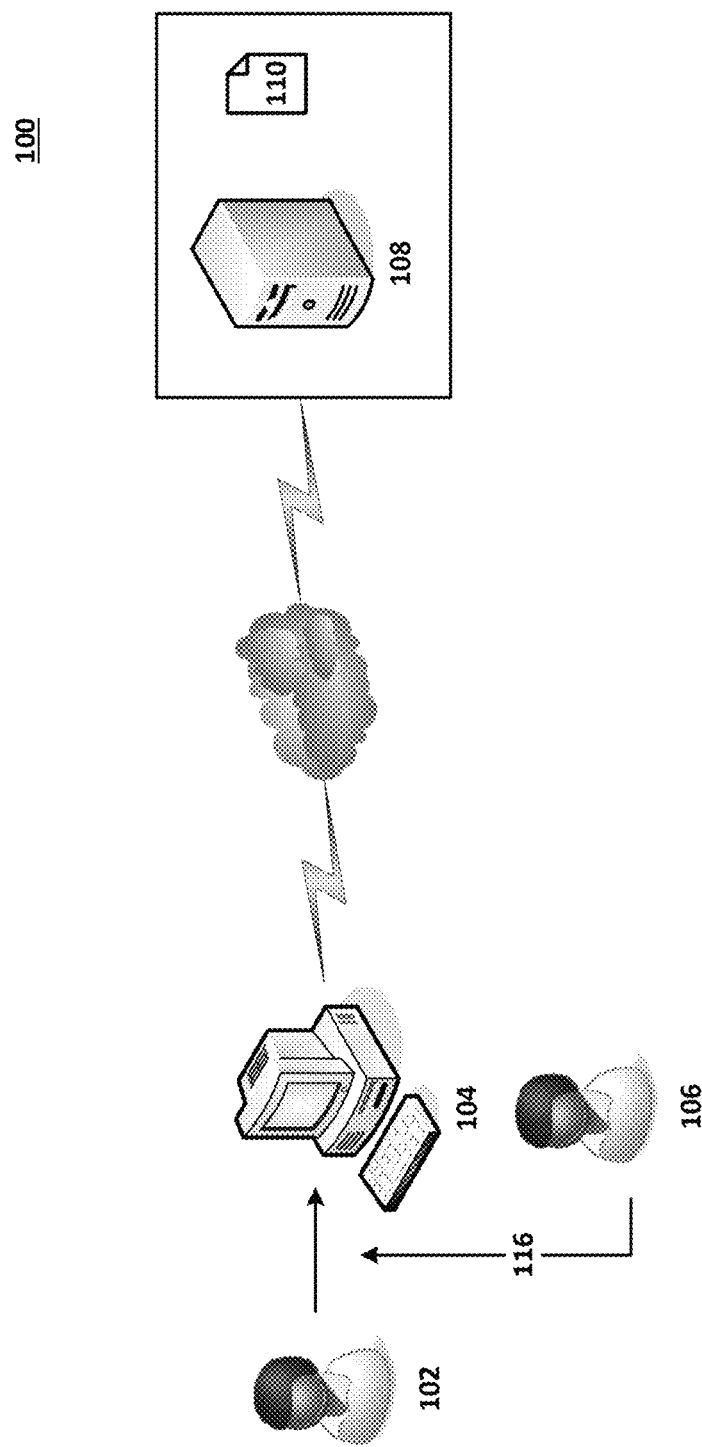
FIG. 1 shows a principle diagram of a Cross-Site Request Forgery (CSRF) attack.

Illustrative embodiments of the invention are described below in conjunction with accompany drawings. For the purpose of clarity and conciseness, not all features of an actual implementation are described in this specification. However, it will be appreciated that in the development of any such actual embodiment, numerous implementation-specific decisions should be made to achieve the developers' specific goals, such as being in compliance with system-related and business-related constraints, which may vary from one implementation to another. Moreover, it will be appreciated that although such a development effort might be complex and time-consuming, it is a routine undertaking for those of ordinary skill in the art having the benefit of this disclosure.

Here, it shall be noted that, in order to avoid obscuring the invention by unnecessary details, only functional structures and/or process steps that are closely associated with the solution of the invention are illustrated in the drawings, and other details that have little relationship therewith are omitted.

To better explain the principle of the technical solution in the disclosure, the principle of a Cross-Site Request Forgery (CSRF) attack will be first described with reference to FIG. 1.

FIG. 1 illustratively shows the principle of a CSRF attack. In system 100 shown in FIG. 1, user 102 accesses a web application 110 located at server side 108 through his client browser 104. Normally, server 108 first needs to verify identity of the user 102. There are various ways to verify the identity of the user 102. Generally, these verification methods are performed by prompting user 102 to input authentication information for accessing the web application 110. After the user 102 receives the input prompt, the user inputs authentication information for accessing the web application 110 and sends a login request containing the authentication information to server 108. Server 108 verifies whether user 102 is a legal user of web application 110 by verifying authentication information of user 102 contained in the received login request. Assume that user 102 has inputted correct authentication information, then server 108 will consider user 102 as a legal user of the web application 110. Since server 108 identifies user 102 by a cookie, client browser 104 will get a cookie for the identifying identity of user 102 after user 102 passes through identity verification. The cookie contains authentication information of user 102 and is used to identify a session between client browser 104 of user 102 and web application 110 of server 108. Here, the procedure of CSRF attack will be described by assuming web application 110 is a network bank and that user 102 wants to perform a transfer operation through the network bank, for example. Assume that user 102 has an account UA in the bank, and he wants to transfer 1000 CNY to another account UA2 through the network bank. Normally, request sent by user 102 through his client browser 104 should be as follows:

http://bank.example/
    withdraw?account=UA&amount=1000&for=UA2

Assume that attacker 106 has an account ATT in that bank. Meanwhile the attacker knows that this Universal Resource Locator (URL) in the context may perform a transfer operation. At this moment, attacker 106 embeds the following codes in a certain page in which he has authority:

src="http://bank.example/
    withdraw?account=UA&amount=1000&for=ATT"

Attacker 106 induces user 102 to access the page having the above embedded codes via advertisement and the like. If user 102 has accessed the page having the above embedded codes, the above embedded codes will be executed. That is, client browser 104 of user 102 will send URL in the above embedded codes:

http://bank.example/
    withdraw?account=UA&amount=1000&for=ATT together with cookie in client browser 104 of user 102 for identifying session between client browser 104 of user 102 and network bank to the network bank. It can be seen that, the URL corresponds to a transfer request of transferring 1000 CNY in account UA of user 102 to account ATT of attacker 106. Normally, the request will fail, because the network bank requires authentication information of user 102. However, if the cookie in client browser 104 of user 102 for identifying a session between client browser 104 of user 102 and network bank has not yet expired, since the cookie contains therein authentication information of user 102, the network bank will receive the transfer request that contains authentication information of user 102 for transferring 1000 CNY in account UA of user 102 to account ATT of attacker 106. Since the request contains therein authentication information of user 102, the network bank will process the above request as legal request, i.e. transfer 1000 CNY in account UA of user 102 to account ATT of attacker 106.

The principle of CSRF attack is briefly described in the above. The method and device for preventing CSRF attack according to embodiments of the disclosure will be continually described with reference to the above examples. The description below are all illustrative, and based on the content described in the disclosure, those skilled in the art can obtain other possible embodiments falling into the scope covered by the concept of the disclosure by manner of adding, reducing, combining, modifying and the like, all of which will fall into the protection scope of the disclosure.

The disclosure introduces a device for intercepting request sent from a client browser to a server, and the device adds a token into request sent by the client browser. Thereafter, the device will verify each request sent by the client browser to determine whether each request is safe.

Figure 2:
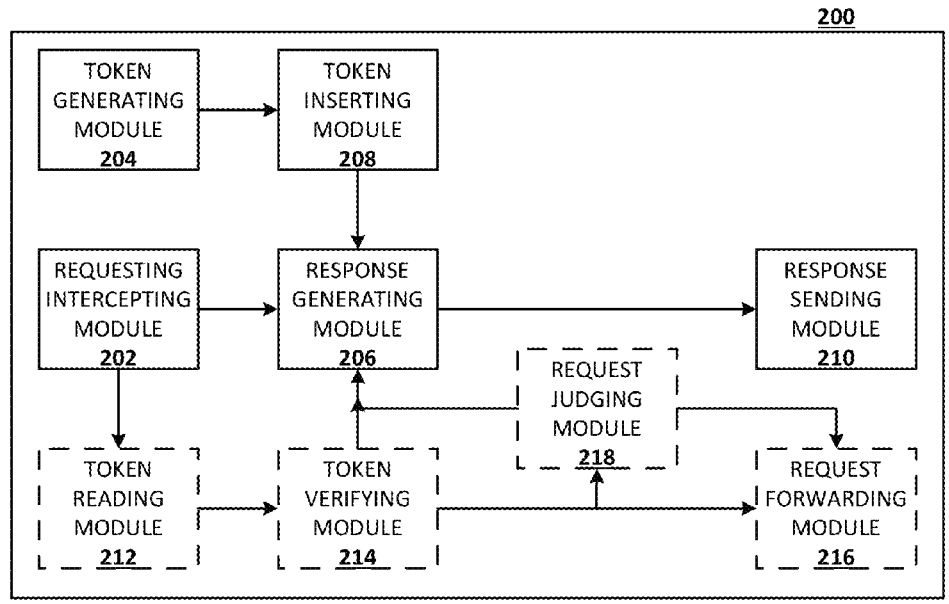
FIG. 2 shows a method 200 for preventing a CSRF attack according to an embodiment of the disclosure.

Referring to FIG. 2, in which is shown a device 200 for preventing CSRF attack according to an embodiment of the disclosure. Device 200 comprises:

a request intercepting module 202 for intercepting request sent from a client browser to a server;
    a token generating module 204 for generating a token;
    a response generating module 206 for generating a response to the request;
    a token inserting module 208 for inserting the token into the response to the request; and
    a response sending module 210 for sending the response to the request inserted with the token to the client browser.

The response to the request may be a HTTP 307 response.

Further, the device 200 for preventing CSRF attack according to an embodiment of the disclosure may further comprise: a token reading module 212 for reading token in the subsequent request sent from the client browser to the server; a token verifying module 214 for verifying whether the token in the subsequent request sent from the client browser to the server is valid. If there is no token in the URL requested in the subsequent request sent from the client browser to the server, but there is a token in the Referer header and the token verifying module 214 verifies that the token is valid, then: the response generating module 206 generates a response to the subsequent request; the token inserting module 208 inserts the token into the response to the subsequent request; and the response sending module 210 sends the response to the subsequent request to the client browser with the token inserted in the response.

Further, the device 200 for preventing CSRF attack according to an embodiment of the disclosure may further comprise: a request forwarding module 216 for forwarding to the server the subsequent request sent from the client browser to the server. If there is a token in URL requested in the subsequent request sent from the client browser to the server and the token verifying module 214 verifies that the token is valid; then the request forwarding module 216 forwards the subsequent request to the server.

Further, the device 200 for preventing CSRF attack according to an embodiment of the disclosure may further comprise: a request judging module 218 for judging whether the subsequent request sent from the client browser to the server is an Ajax request. If the request judging module 218 determines that the subsequent request sent from the client browser to the server is an Ajax request, and there is no token in the requested URL but there is a token in the Referer header and the token verifying module 214 verifies that the token is valid, then the request forwarding module 216 forwards the subsequent request to the server. If the request judging module 218 determines that the subsequent request sent from the client browser to the server is not an Ajax request, and there is no token in the requested URL but there is a token in the Referer header and the token verifying module 214 verifies that the token is valid, then: the response generating module 206 generates a response to the subsequent request; the token inserting module 208 inserts the token into the response to the subsequent request; and the response sending module 210 sends the response to the subsequent request inserted with the token to the client browser.

It is to be emphasized by the applicant that, although the device 200 for preventing CSRF attack shown in FIG. 2 comprises a plurality of modules, not every module is necessary, some of which may be added or removed according to design requirement. For example, the device 200 for preventing CSRF attack may only comprise those modules shown by solid lines.

Figure 3A:
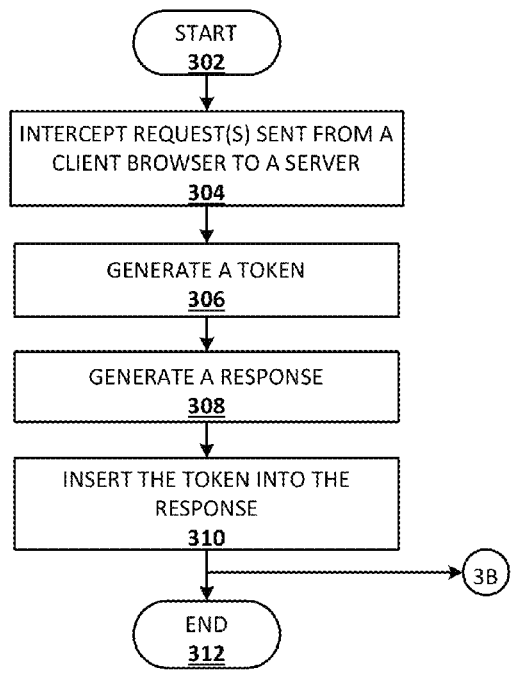
FIG. 3a shows a method 300 for preventing a CSRF attack according to an embodiment of the disclosure.

Referring to FIG. 3a, in which a method 300 for preventing CSRF attack according to an embodiment of the disclosure is shown.

The method 300 of FIG. 3a starts from step 302. Next, the method 300 proceeds to step 304, in which a request sent from a client browser to a server is intercepted. The request may be intercepted by a request intercepting module 202 in device 200 as shown in FIG. 2, and the request intercepting module 202 may be implemented by using Java Servlet, for example. Any existing approach for intercepting a request may be used to achieve the above object, and here these approaches are omitted for brevity.

Next, the method 300 proceeds to step 306, in which a token is generated. The token will be inserted into a response to be returned to the client browser. Generation of the token may utilize the algorithm and methods in the art, such as a universal unique identifier (UUID) or random algorithm.

Next, the method 300 proceeds to step 308, in which a response to the intercepted request sent from the client browser to the server is generated. According to an embodiment of the disclosure, the response is a HTTP 307 response. The HTTP 307 response is a response for redirecting and follows HTTP 1.1 protocol, and the HTTP 307 response can redirect a HTTP request (including HTTP GET and HTTP POST) sent from a client browser to a preset location.

Next, the method 300 proceeds to step 310, in which the generated token is inserted into the generated response to the intercepted request sent from the client browser to the server. At this moment, the token generated in step 306 is included in the response returned to the client browser.

Next, the method 300 proceeds to step 312 where the method ends. Or, optionally, the method 300 may also proceed to FIG. 3b.

Figure 3B:
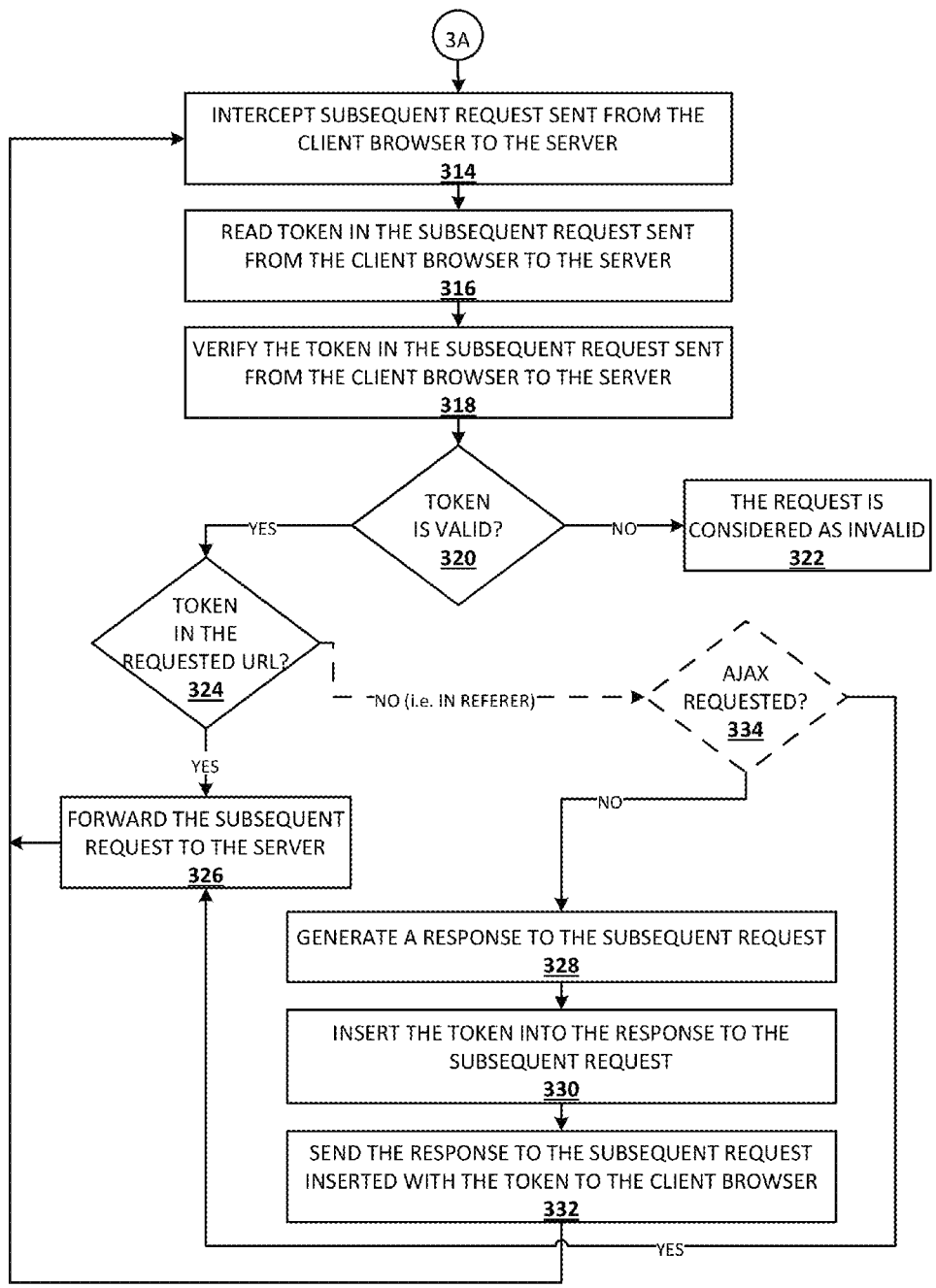
FIG. 3b shows some optional steps that may be included in the method 300 for preventing a CSRF attack according to an embodiment of the disclosure.

Referring to FIG. 3b, in which some optional steps that may be included in the method 300 for preventing CSRF attack according to an embodiment of the disclosure are shown.

Continuing from FIG. 3a, the method 300 for preventing CSRF attack according to an embodiment of the disclosure may further include a step 314, in which subsequent request sent from the client browser to the server is intercepted. Here, the subsequent request corresponds to a request sent after the method shown in FIG. 3a is executed and the client browser has received the response returned by device 200. Since a token is inserted into the response returned to the client browser by device 200, the token will also be included in the subsequent request subsequently sent from the client browser to the server.

Next, the method 300 proceeds to step 316, in which the token in the subsequent request sent from the client browser to the server is read.

Next, the method 300 proceeds to step 318, in which it is verified whether the token in the subsequent request sent from the client browser to the server is valid. Thereafter, the method 300 proceeds to step 320, in which it is determined whether the token in the subsequent request sent from the client browser to the server is valid. The determination is made by comparing the read token in the subsequent request sent from the client browser to the server with the token recorded in the device 200 and inserted into the response returned to the client browser by the device 200. If the two tokens are different, the method proceeds to step 322, at which the request is considered invalid. Thereafter, the method 300 returns to step 314. Subsequent request sent from the client browser to the server is continually intercepted. If the two tokens are the same, the method 300 proceeds to step 324, at which it is further verified whether there is a token in the URL requested in the subsequent request sent from the client browser to the server. If there is a token in the URL requested in the subsequent request sent from the client browser to the server and the token is valid, the method 300 proceeds to step 326, at which the subsequent request is forwarded to the server. Since the attacker can not know the value of the token, the request is safe in the case where there is a valid token in the requested URL, and thus the request may be forwarded to the server for processing.

If there is no token in the URL requested in the subsequent request sent from the client browser to the server, then it is further verified whether there is a token in Referer header in subsequent request sent from the client browser to the server and whether the token is valid. The Referer header is a field in the hypertext transfer protocol (HTTP) head defined in HTTP protocol. The Referer header allows a client to specify the address of a source resource of requested URL, which will allow a server to generate a back-off linked list. For example, if a user accesses to IBM technical support page (www.ibm.com/support) by clicking a link in IBM home page (www.ibm.com), then address of IBM home page will be included in the Referer header in a request sent by a client browser for accessing the IBM technical support page. For example, the request might be as follows:

GET http://www.ibm.com/support
...
Referer: http://www.ibm.com
...

If there is no token in URL requested in the subsequent request sent from the client browser to the server, but there is a token in Referer header and the token is valid, the method 300 proceeds to step 328, in which a response to the subsequent request is generated. Thereafter, in step 330, the token is inserted into the response to the subsequent request. And in step 332, the response to the subsequent request inserted with the token is sent to the client browser.

Optionally, if there is no token in the URL requested in the subsequent request sent from the client browser to the server, but there is a token in the Referer header and the token is valid, the method 300 may further proceed to step 334, in which it is judged whether the subsequent request sent from the client browser to the server is an Ajax request. If the subsequent request is an Ajax request, the method 300 proceeds to step 326, in which the subsequent request is forwarded to the server. If it is not an Ajax request, the method 300 proceeds to step 328, in which a response to the subsequent request is generated. Thereafter, in step 330, the token is inserted into the response to the subsequent request, and in step 332, the response to the subsequent request inserted with the token is sent to the client browser. Due to the nature of an Ajax request, in the case where the validity of the token has been verified, the request can be considered to be safe, and thus the request can be forwarded to the server for processing.

Figure 4:
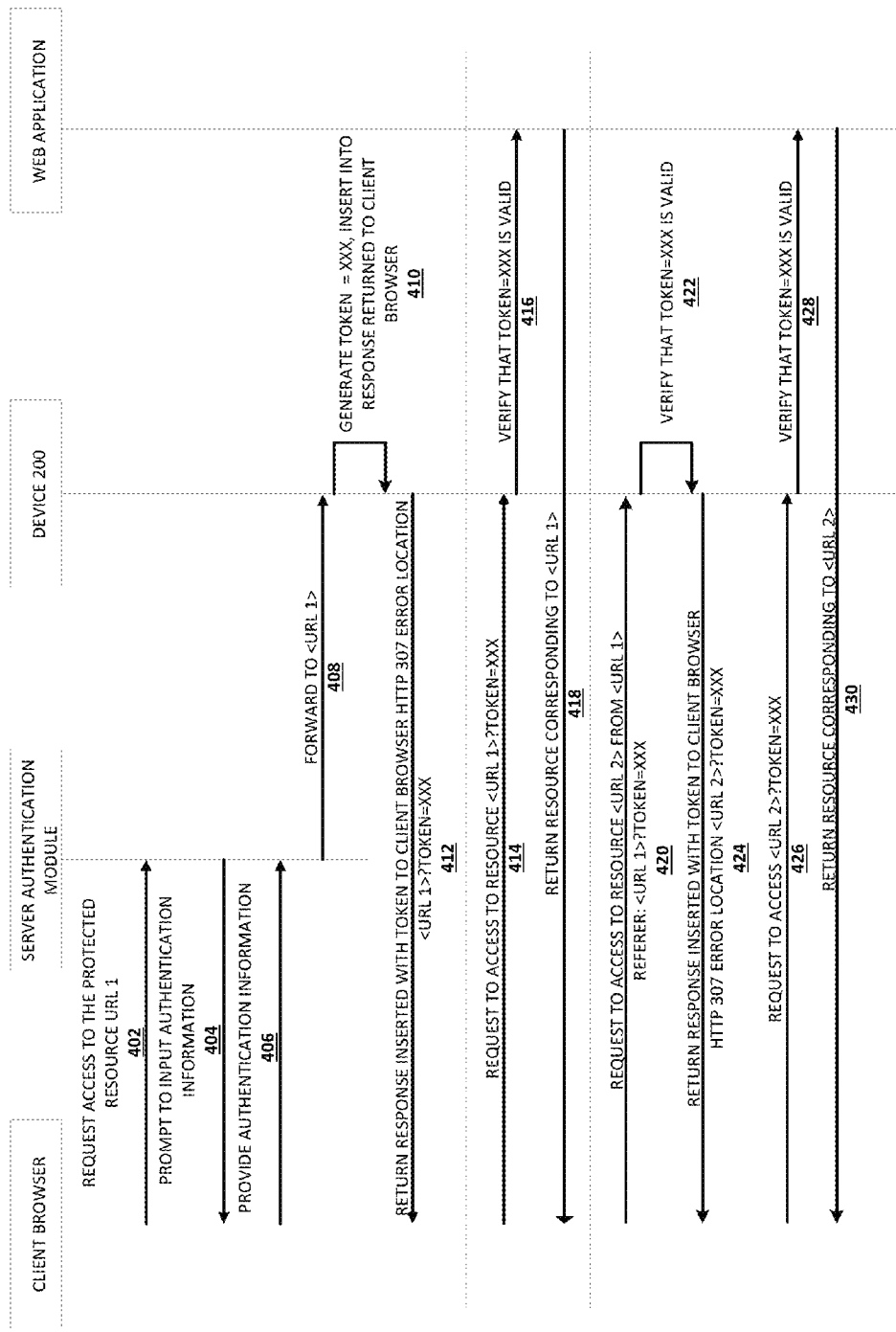
FIG. 4 shows a signal flow according to an embodiment of the disclosure.

Referring to FIG. 4, in which a signal flow according to an embodiment of the disclosure is shown. It is to be emphasized by the applicant that FIG. 4 is merely for purpose of illustration and can not be construed as a limit to the protection scope of the disclosure. In FIG. 4, assume that a user requests access to the protected resource URL 1 through his client browser, as shown by 402. The request is sent to an authentication module of server, and the authentication module prompts the user to input authentication information, as shown by 404. Then, the user provides authentication information, as shown by 406. Then, the authentication module of the server verifies authentication information provided by user. If the authentication information is correct, the authentication module of server forwards the request to URL 1, as shown by 408. In prior art, after the authentication module of server verifies that authentication information of user is correct, the request will be directly forwarded to a Web application in the server. According to one or more embodiments of the disclosure, the device 200 intercepts the request (here, the request is a request of accessing to <URL 1> forwarded by the authentication module of server). Thereafter, a token generating module in device 200 generates a token XXX (such as Token=XXX shown by 410), and the token XXX is inserted into a response returned to the client browser, as shown by 410. According to an embodiment of the disclosure, device 200 returns a HTTP 307 response to the client browser, and redirects the request to <URL 1>. The response is typically shown as follows:

---
HTTP 307 Temporary Redirect
Location: <URL 1>?Token=XXX
---

It can be seen that the token XXX is inserted into the response, and the token is inserted into URL 1 that will be again requested by user, i.e., <URL 1>?Token=XXX, as shown by 412.

After the client browser receives the response inserted with token XXX, the client browser requests to access to address <URL 1> specified in the response. At this moment, the request is typically shown as follows.

GET <URL 1>?Token=XXX

It can be seen that, token XXX is also inserted into URL of the request, i.e., <URL 1>?Token=XXX, as shown by 414. At this moment, device 200 intercepts the request again, and verifies whether there is a token in the URL requested in the request and whether the token is valid. If there is a token in the requested URL and the token is valid, i.e., the requested URL is <URL 1>?Token=XXX and Token=XXX, device 200 forwards the request to the Web application of server, as shown by 416. The web application responds to the request after the web application receives the request, and returns requested resource <URL 1> to the client browser, as shown by 418. At this moment, token XXX is also inserted into address of page corresponding to the returned resource <URL 1>, i.e., address corresponding to the returned page is <URL 1>?Token=XXX.

Assume that user requests to access to resource <URL 2> by clicking a link in a page corresponding to resource <URL 1>. According to HTTP protocol, at this moment, the request will have a Referer header to indicate the origin of accessing to resource <URL 2>. At this moment, since token XXX has been inserted into address of page corresponding to resource <URL 1>, i.e., <URL 1>?Token=XXX, the typical request will be as follows:

---
GET <URL 2>
...
Referer: <URL1>?Token=XXX
...
---

That is, token XXX is also inserted into the request, and the token is located at the Referer header, as shown by 420.

According to one or more embodiments of the disclosure, device 200 intercepts the request again (here, it is a request sent by client browser for accessing <URL 2> through <URL 1>), and verifies whether there is a token in the URL requested in the request and whether the token is valid, as shown by 422. If there is no token in the requested URL (here, URL 2), but there is a token in Referer header and the token is valid, i.e., Referer: <URL 1>?Token=XXX, and Token=XXX, device 200 again inserts token XXX into a response returned to the client browser, as shown by 424. According to an embodiment of the disclosure, device 200 returns a HTTP 307 response to the client browser, and redirects the request to <URL 2>, and inserts token XXX again. The response is typically as follows:

---
HTTP 307 Temporary Redirect
Location: <URL 2>?Token=XXX
---

It can be seen that, token XXX is also inserted into the response, and the token is inserted into URL2 that will be again requested by user, i.e., <URL 2>?Token=XXX, as shown by 424.

After client browser receives the above response inserted with the token, client browser requests to access to address <URL 2> specified in the response. At this moment, the request is typically as follows:

GET <URL 2>?Token=XXX

It can be seen that, token XXX is also inserted into the URL requested in the request, as shown by 426. At this moment, device 200 intercepts the request again, and verifies whether there is a token in URL requested in the request and whether the token is valid. If there is a token in the requested URL and the token is valid, i.e., the requested URL is <URL 2>?Token=XXX and Token=XXX, device 200 forwards the request to the web application of server, as shown by 428. The web application responds to the request after the web application receives the request, and returns the requested resource <URL 2> to the client browser, as shown by 430. At this moment, token XXX is also inserted into address of a page corresponding to the returned resource <URL 2>, i.e., <URL 2>?Token=XXX.

Below, some other embodiments according to the disclosure will be briefly described. According to an embodiment of the disclosure, a device for preventing CSRF attack comprises: a request intercepting module for intercepting request sent from a client browser to a server; a token reading module for reading token in subsequent request sent from the client browser to the server; a token verifying module for verifying whether the token in the subsequent request sent from the client browser to the server is valid.

Optionally, the device for preventing CSRF attack further comprises: a request forwarding module for forwarding to the server the request sent from the client browser to the server. If there is a token in the URL requested in the request sent from the client browser to the server and the token verifying module verifies that the token is valid, then the request forwarding module forwards the subsequent request to the server.

Optionally, the device for preventing CSRF attack further comprises: a response generating module for generating a response to the request; a token inserting module for inserting the token into the response to the request; and a response sending module for sending the response to the request inserted with the token to the client browser. If there is no token in URL requested in the request sent from the client browser to the server, but there is a token in a Referer header and the token verifying module verifies that the token is valid, then: the response generating module generates a response to the request; the token inserting module inserts the token into the response to the request; and the response sending module sends the response to the request to the client browser with the token inserted into the response.

Optionally, the device for preventing CSRF attack further comprises: a request judging module for judging whether the request sent from the client browser to the server is an Ajax request. If the request judging module determines that the request sent from the client browser to the server is an Ajax request, and there is no token in the requested URL but there is a token in Referer header and the token verifying module verifies that the token is valid, then the request forwarding module forwards the request to the server. If the request judging module determines that the request sent from the client browser to the server is not an Ajax request, and there is no token in the requested URL but there is a token in Referer header and the token verifying module verifies that the token is valid, then: the response generating module generates a response to the request; the token inserting module inserts the token into the response to the request; and the response sending module sends the response to the request to the client browser with the token inserted into the response.

According to an embodiment of the disclosure, a method for preventing CSRF attack comprises: intercepting request sent from a client browser to a server; reading a token in the request sent from the client browser to the server; verifying whether the token in the request sent from the client browser to the server is valid.

Optionally, the method for preventing CSRF attacks further comprises: if there is a token in the URL requested in a subsequent request sent from the client browser to the server and the token is valid, then forwarding the subsequent request to the server.

Optionally, the method for preventing CSRF attack further comprises: if there is no token in URL requested in the request sent from the client browser to the server, but there is a token in the Referer header and the token is valid, then: generating a response to the request; inserting the token into the response to the request; and sending the response to the request to the client browser with the token inserted into the response.

Optionally, the method for preventing CSRF attacks further comprises: judging whether the request sent from the client browser to the server is an Ajax request. If the request sent from the client browser to the server is an Ajax request, and there is no token in the requested URL but there is a token in the Referer header and the token is valid, then forwarding the request to the server. If the request sent from the client browser to the server is not an Ajax request, and there is no token in the requested URL but there is a token in the Referer header and the token is valid, then: generating a response to the request; inserting the token into the response to the request; and sending the response to the request to the client browser with the token inserted into the response.

It can be seen from the above illustrative description that, with the method and device of the disclosure, a token is inserted into a user's request for accessing a resource through a client browser. Thus device 200 can assure that the request is issued by the user himself by verifying whether the token in the request is valid, thereby preventing a CSRF attack.

The basic principles of the disclosure are described above in conjunction with specific embodiments, however, it is to be noted that, for those of ordinary skill in the art, it will be understood that all or any step or component of the method and apparatus of the invention may be implemented in any computing apparatus (including processor, storage medium etc) or network of computer apparatus in form of hardware, firmware, software or a combination thereof, which is achievable for those of ordinary skill in the art by using their basic programming skills after reading the description of the embodiments.

Thus, the object of the embodiments may also be implemented by a program or a group of programs executed on any computing apparatus. The computing apparatus may be known general purpose apparatus. Thus, the object of the invention may also be implemented by merely providing program product containing program codes for implementing the method or apparatus. That is, such program product may also constitute the invention, and the storage medium on which such program product is stored also constitutes the invention. Obviously, the storage medium may be any known storage medium or any storage medium that will be developed in future.

It should also be noted that, in the apparatus and method of the invention, obviously, each component or each step may be separated and/or recombined. Such separation and/or recombination should be considered as an equivalent solution of the invention. Further, the steps for performing the above series of processes may be naturally executed in a time sequence according to a sequence of description, but does not necessarily need to execute in time sequence. Some steps may be executed in parallel or independently to each other.

Although the invention and its advantages have been described in detail, it should be appreciated that various modifications, replacements and alternations may be made without departing from the spirit and scope of the invention defined by the appended claims. Further, the term "comprising", "including" or any other variations is intended to cover non-exclusive inclusion, thereby making a procedure, method, item or apparatus that contains a series of elements not only includes those elements, but also contains other elements that aren't listed explicitly, or contains elements inherent in such procedure, method, item or apparatus. Unless otherwise defined, an element defined by phase "including a . . . " does not exclude other same element that also exist in the procedure, method, item or apparatus that contains that element.

The invention claimed is:

1. A method for preventing a Cross-Site Request Forgery (CSRF) attack, the method comprising:
   intercepting one or more requests sent from a client browser to an authentication module of a server to access a first protected resource at a first Universal Resource Locator (URL), wherein in response to receiving the one or more requests, the authentication module issues a prompt for authentication information associated with a user;
   generating a token;
   recording the token as a recorded token;
   generating a response to the one or more requests;
   inserting the recorded token into the first URL within the response to the one or more requests;
   sending the response to the one or more requests to the client browser with the recorded token inserted in the response;
   in response to sending the response to the one or more requests to the client browser and the client browser receiving the response to the one or more requests, intercepting a subsequent request that is sent from the client browser to the server, wherein the subsequent request comprises a request to access the first protected resource at the first URL;

in response to intercepting the subsequent request:
  reading an intercepted token in the subsequent request;
  determining whether the intercepted token is valid and inserted within the address of the page corresponding to the first URL; and
  in response to determining the intercepted token in the subsequent request is inserted within the address of the page corresponding to the first URL and the intercepted token in the subsequent request as being valid, forwarding the subsequent request to the server; and
in response to the client browser receiving the first protected resource at the first URL, intercepting a secondary request to access a second protected resource at a second URL, wherein the secondary request is initiated by selecting the second URL within a page corresponding to the first URL, wherein the secondary request to access the second protected resource at the second URL further comprises a GET request to the second URL and a referer header that contains the first URL and a secondary token inserted within the address of the page corresponding to the first URL.

2. The method according to claim 1, wherein the response is a hypertext transfer protocol (HTTP) 307 response that is configured to redirect a HTTP request from the client browser to a present location.

3. The method according to claim 2, further comprising:
redirecting the client browser to a particular universal resource locator (URL) by inserting the intercepted token into the HTTP 307 response, wherein the HTTP 307 response includes the particular URL.

4. The method according to claim 3, wherein the one or more requests comprises a HTTP GET request.

5. The method according to claim 2, wherein the one or more requests comprises a HTTP POST request.

6. The method according to claim 5, further comprising:
redirecting the client browser to a particular universal resource locator (URL) by inserting the recorded token into the HTTP 307 response, wherein the HTTP 307 response includes the particular URL.

7. The method according to claim 2, wherein the response follows a HTTP 1.1 protocol.

8. The method according to claim 1, further comprising:
in response to determining the intercepted token in the subsequent request is not inserted within the address of the page corresponding to the URL of the URL request within the subsequent request, determining whether the intercepted token in the subsequent request is included in a Referer header field within a hypertext transfer protocol (HTTP) head that is defined within a HTTP protocol of the device, wherein the contents of the Referer header field are generated by the client browser and inserted within the HTTP head by the client browser; and
in response to determining the intercepted token in the subsequent request is included in the Referer header field within the HTTP head defined within the HTTP protocol of the device and verifying the intercepted token as being valid:
  generating a response to the subsequent request;
  inserting the intercepted token into the response to the subsequent request; and
  sending the response to the subsequent request to the client browser.

9. The method according to claim 8, further comprising:
in response to the intercepted token in the subsequent request being included in the Referer header field within the HTTP head defined within the HTTP protocol of the device and verifying the intercepted token as valid, generating a back-off linked list based on a home page associated with the URL request.

10. The method according to claim 1, further comprising:
judging whether the subsequent request is an Ajax request.

11. The method according to claim 10, further comprising:
determining whether the intercepted token in the subsequent request is inserted within an address of a page corresponding to a universal resource locator (URL) of a URL request within the subsequent request;
in response to the subsequent request being an Ajax request, the intercepted token in the subsequent request not being inserted within the URL request, verifying the intercepted token as being a valid token in a Referer header, forwarding the subsequent request to the server.

12. The method according to claim 10, further comprising:
in response to determining the subsequent request is not an Ajax request, the intercepted token in the subsequent request not being inserted within the URL request, and there being a valid token in a Referer header:
  generating a response to the subsequent request;
  inserting the intercepted token into the response to the subsequent request; and
  sending the response to the subsequent request to the client browser.

13. The method according to claim 1, further comprising:
reading a received token in at least one of the one or more requests; and
verifying whether the received token in the at least one of the one or more requests is valid.

14. The method according to claim 1, wherein the subsequent request is intercepted after an authentication request comprising authentication information of the client browser is sent from the client browser to the server and the server verifies the authentication information.

15. The method according to claim 1, wherein the recorded token is generated utilizing a random algorithm.

16. The method according to claim 1, wherein the recorded token is generated utilizing a universal unique identifier (UUID).

17. The method according to claim 1, wherein the one or more requests and the subsequent request are intercepted at a java servlet.

18. The method according to claim 1, wherein:
determining whether the intercepted token is valid further comprises comparing the recorded token with the token in the subsequent request to verify whether the token in the subsequent request is valid and is identical to the recorded token; and
the server forwards the first protected resource at the first URL to the client browser in response to receiving the forwarded subsequent request.

19. The method according to claim 1, further comprising:
determining whether the secondary token is valid by comparing the secondary token with the recorded token to verify whether the secondary token is identical to the recorded token; and
in response to determining the secondary token is contained within the referer header of the first URL within secondary request and is valid:
  generating a secondary response to the secondary request;
  inserting the recorded token into the second URL within the secondary response, wherein the secondary response is configured to redirect the secondary request from the client browser to the second URL; and
  sending the secondary response to the client browser.

20. The method according to claim 19, further comprising:
subsequent to the client browser receiving the secondary response, intercepting, from the client browser, a subsequent secondary request to access the second protected resource at the second URL;
verifying whether there is a token in the second URL within the subsequent secondary request;
in response to determining there is a token in the second URL within the subsequent secondary request, determining whether the token in the second URL within the subsequent secondary request is valid by comparing the token in the second URL within the subsequent secondary request with the recorded token; and
in response to determining the token in the second URL within the subsequent secondary request is inserted within the address of the page corresponding to the second URL and is valid, forwarding the subsequent secondary request to the server.

\* \* \* \* \*